United States Patent [19]
Bushman et al.

[11] Patent Number: 5,651,305
[45] Date of Patent: Jul. 29, 1997

[54] FOOD PRODUCT FINISHER

[75] Inventors: Ronald C. Bushman, Brea; Robert S. Thompson, Temple City, both of Calif.

[73] Assignee: Brown International, Inc., Covina, Calif.

[21] Appl. No.: 453,801

[22] Filed: May 30, 1995

[51] Int. Cl.⁶ .................................. A23N 1/00; B30B 3/00
[52] U.S. Cl. ........................... 99/510; 100/145; 198/676
[58] Field of Search .................. 99/509, 510; 100/93 S, 100/117, 125, 145, 904; 198/661, 676; 366/87, 88, 323; 425/208

[56] References Cited

U.S. PATENT DOCUMENTS

| | | | |
|---|---|---|---|
| 1,023,888 | 4/1912 | Sorenson | 198/676 |
| 2,355,091 | 8/1944 | McDonald | 100/145 |
| 2,583,600 | 1/1952 | Schreiber | 100/145 |
| 2,607,077 | 8/1952 | Dulmage | 366/87 |
| 2,775,191 | 12/1956 | Youd . | |
| 2,901,967 | 9/1959 | Dahl | 100/117 |
| 3,370,527 | 2/1968 | Holbrook . | |
| 4,240,755 | 12/1980 | Frankland | 388/89 |
| 4,329,313 | 5/1982 | Miller et al. | 366/88 |
| 4,665,816 | 5/1987 | Waters et al. . | |
| 4,705,055 | 11/1987 | Rohm et al. . | |
| 4,896,969 | 1/1990 | Dray | 366/88 |
| 5,156,872 | 10/1992 | Lee | 99/510 |
| 5,396,836 | 3/1995 | Kim | 99/510 |

FOREIGN PATENT DOCUMENTS

| | | | |
|---|---|---|---|
| 1038326 | 5/1953 | France | 100/93 S |
| 937579 | 12/1955 | Germany . | |
| 937579 | 12/1956 | Germany | 198/676 |

OTHER PUBLICATIONS

Pulper/Finisher Model PF 200, *FMC Corporation Brochure*, (1976).
Super Finisher, *FMC Corporation Brochure*, 298 (1974).
D–Turbo Extractor, *FENCO Food Engineering Co. Brochure*, (1990).
Tomato Juice Extracting Unit, *Ing. A. Rossi Brochure*, (1989).
Juices Extracting Units, *Ing. A. Rossi Brochure*, (1989).
Pulper/Finisher/Seed Separator/Disintegrator/Homogeniser, *Rossi & Catelli Brochure*, (1978).
Pulpers Versus Finishers, *Langsenkamp Brochure*, (1971).
Turbo Extractor, *Manzini Brochure*, (1989).
Food Equipment Technology, *FENCO Brochure*, (1989).

*Primary Examiner*—David Scherbel
*Assistant Examiner*—Terrence R. Till
*Attorney, Agent, or Firm*—Lyon & Lyon

[57] ABSTRACT

A food product finisher includes a finisher housing and screen supported by the housing. A rotor driven within the screen has an inlet section with inlet vanes of reduced diameter in a steep helical configuration. The inlet vanes are joined continuously into body vanes of full height and less steep helical configuration on the body of the rotor. Steps or transition sections may be provided in the vanes. The vane configuration provides uniform loading of the vanes, high efficiency and reduced power consumption.

18 Claims, 3 Drawing Sheets

FOOD PRODUCT FINISHER

BACKGROUND OF THE INVENTION

Field of the Invention

The field of the invention is food product finishers.

Food product finishers separate liquids and solids by removing relatively larger particles, including seeds, stems, skins, bones and other undesirable materials from the juice or puree of fruits, vegetables or other food products.

Screw design finisher machines have a screw or auger surrounded by a cylindrical or conical screen. The rotating auger drives the food product against and along the screen. Liquids and small particles pass through the screen and are collected while larger solids are carried by the auger to the discharge end of the screen. A discharge end valve provides back pressure to help force the juice portion through the screen.

Paddle type machines operate in a somewhat similar manner, but include paddles having a fixed or adjustable pitch angle. Food product finishers may finish whole or pre-processed food.

SUMMARY OF THE INVENTION

The present invention is directed to an improved food product finisher. To this end, a food product finisher has a rotor including inlet vanes curving at a first pitch angle. The vanes extend onto a body of the rotor with a second pitch angle which is less than or more gradual than the first pitch angle. The height or diameter of the vanes on the inlet section is preferably less than the height or diameter of the vanes on the rotor body.

In an alternative embodiment, the vanes may have abrupt vane surface changes, to better propel liquid through the screen.

Accordingly, it is an object of the present invention to provide an improved food product finisher. Other and further objects and advantages will appear hereinafter.

BRIEF DESCRIPTION OF THE DRAWINGS

In the drawings, wherein similar reference characters denote similar elements throughout the several views:

FIGS. 2–14 6 are side elevation views of additional embodiments of the rotor of the food product finisher of FIG. 1;

FIG. 7 is a side elevation view of another rotor for use in a food product finisher, as shown in FIG. 1; and FIG. 8 is a an end view thereof.

DETAILED DESCRIPTION OF THE PREFERRED EMBODIMENTS

Figure 1:
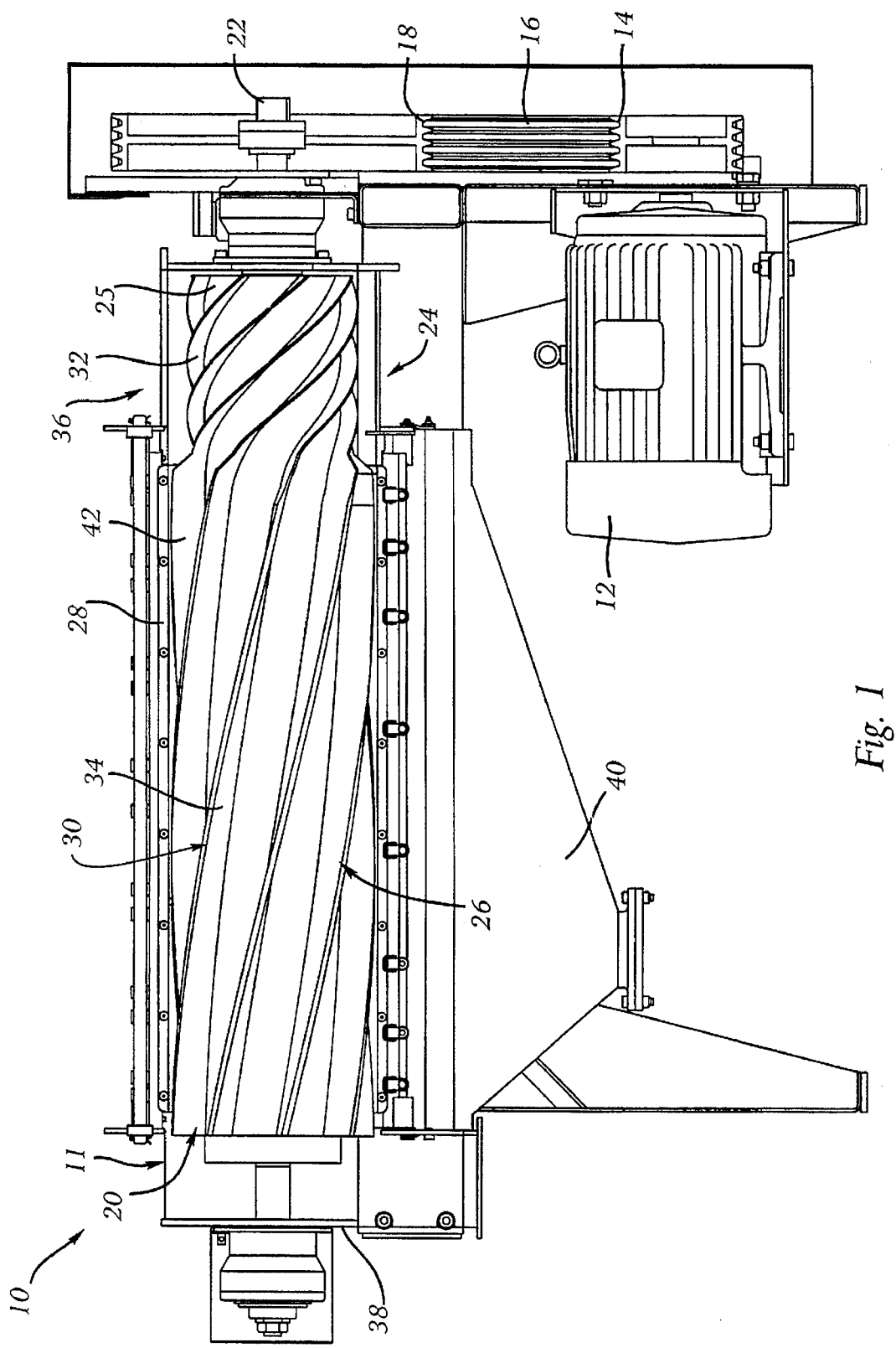
FIG. 1 is a side elevation view, in part section, of the present food product finisher.
Figure 5:
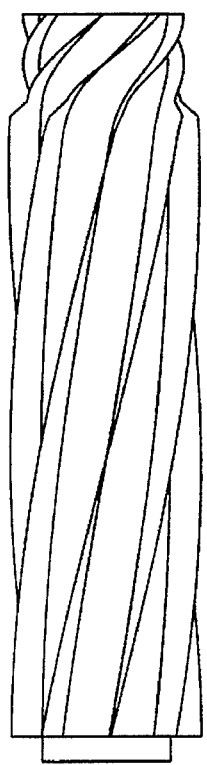
Figure 6:
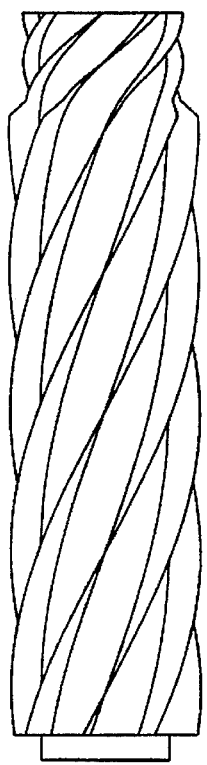
Figure 2:
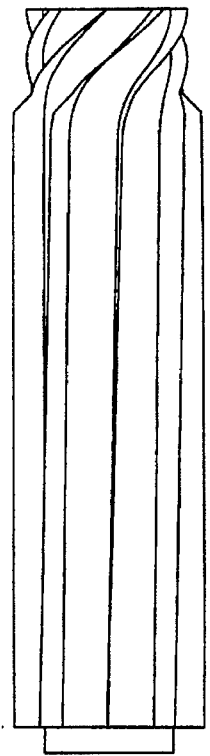
Figure 3:
Figure 4:
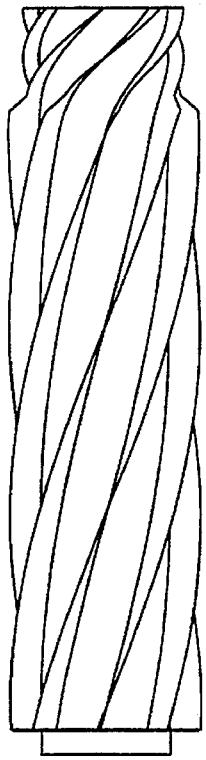

Turning in detail to the drawings, as shown in FIG. 1, the present finisher 10 includes a motor 12 linked by sheaves 14 and 18 and belts 16 to the shaft 22 of a rotor 20. The rotor 20 is horizontally supported on bearings on a housing 11. The rotor 20 includes a central tube 25 having an inlet section 24 and a longer body 26 surrounded by a screen 28. Vanes 30 attached to the central tube 25 continuously extend along the entire length of the rotor from the inlet section 24 across the body 26. The vanes 30 on the inlet section 24 comprising inlet section vanes 32 have a first pitch angle and a reduced vane height or diameter. The vanes on the body 26 comprising body vanes 34 have a second pitch angle, less than the first pitch angle and extend to a full vane height, in contrast to the shorter inlet section vanes 32. The inlet section 24 and body 26 of the rotor 20 have the same root diameter, which is preferably approximately 2–6 times the height of the body vanes.

The finisher 10 includes an inlet 36 from which food enters the finisher 10. A catch pan 40 around and below the screen 28 catches liquids and solids small enough to pass through the screen 28. Remaining solids are conveyed out of the finisher 10 via an outlet 38.

In use, the relatively steeply inclined helical inlet section vanes 32 provide increased axial thrust to convey the food product from the inlet housing to the screen working area. The reduced diameter of the inlet section vanes 32 allow some slippage of food product to occur, thereby loading all vanes uniformly with food product. The inlet 36 provides a wide opening to facilitate loading food product into the finisher 10. The annular space around the inlet section 24 of the rotor 20 allows the incoming product to be distributed relatively evenly to all of the vanes 30 on the rotor 20. As a result, uniform and efficient loading is achieved, and the blade for blade capacity of the finisher is increased over prior art finishers. In contrast, in earlier known finishers having vanes of constant diameter, the food product is immediately delivered to the screen area by each blade. Consequently, only a small portion of the screen's circumference is used in those finishers. The reduced diameter of the inlet vanes reduces this effect. The relatively large diameter of the central tube 25 causes the food product to be presented to the screen sooner than the prior art finishers, thereby also contributing to high efficiency.

Another advantage of the present finisher is that, because of its high efficiency, horsepower per unit of product is substantially reduced. For example, on tomato product, a conventional four-blade paddle finisher processes about 30 tons per hour while drawing about 40 horsepower. In contrast, the present finisher, having an eight-vane rotor, can process up to 75 tons per hour using approximately 25 horsepower.

In a preferred embodiment found to be especially advantageous for finishing fish products, the inlet vanes 32 are 40–75% of the height of the body vanes 34, with eight vanes 30 provided, and with the inlet vanes having a pitch angle of approximately 45° and the body vanes 34 having a pitch angle of approximately 520 . In addition, the throat depth, i.e. the distance from the root diameter of the tube to the screen is preferably approximately two inches. The length of the inlet vanes is preferably 3–4 times greater than the height of the inlet vanes. Of course, other design parameters may also be used.

Preferably, a maximum number of vanes 30 are provided. The rotor advantageously has from 2–10 vanes. However, in the screen working area, i.e. in the cavity formed by the screen and adjacent vanes, the width of the cavity is preferably greater than the depth of the cavity. Consequently, to maintain this characteristic, only a limited number of vanes may be provided without degrading performance.

The preferred pitch angle for the vanes varies with the food product, and more specifically, the ease in which liquid and solid components of the food product separate. With food products having liquid and solid components which are difficult to separate, a low pitch angle is used. In contrast, easily separated food products preferably used a high pitch angle, to increase throughput. Pitch angles from 1 to 60 degrees are preferred. Where the application intends that the solids from the outlet of the finisher should be as dry as possible, then the dryness of the solids determines the throughput of the finisher.

The clearance between the screen and vanes may vary for different food product, as is known in the art. Preferably, the clearance at the inlet end is less than the clearance at the discharge end, to provide for improved drying.

FIGS. 2–6 show alternate embodiments of the rotor 20 having steeply helically curved inlet vanes 32, preferably with an approximately 45° pitch angle, and body vanes 34 having varying offsets or pitch angles as shown. The pitch angles shown in the drawings and described herein are with reference to the angle between the vane (or a specific section of a vane) and a longitudinal axis or spin axis of the rotor.

As shown in FIGS. 1–6, the vanes are preferably manufactured in sections, i.e., the inlet section vanes 32 leading into a transition section 42 and then to the body vanes 34.

Figure 7:
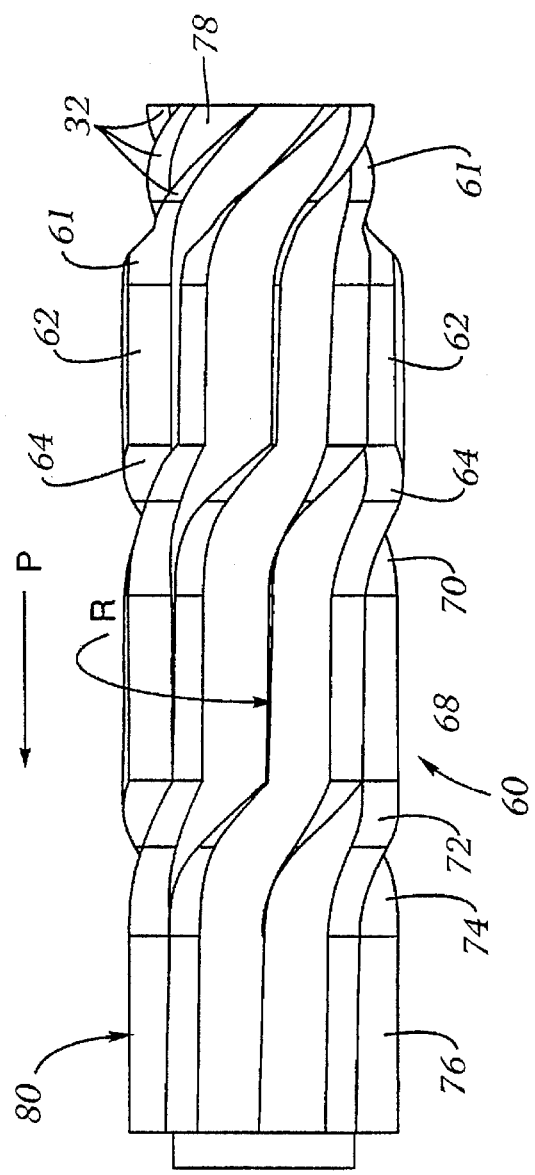
Figure 8:
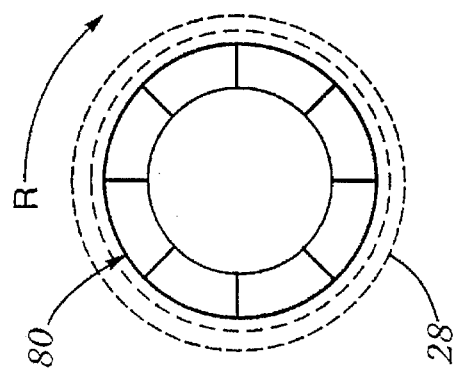

An alternative rotor, as shown in FIGS. 7 and 8 is similar to the rotors in FIGS. 1–6, but includes transitional sections. Referring to FIG. 7, a rotor 60 has steeply helically curving inlet vane sections 32, which join first body vane sections 62 through first transitional sections 61, preferably at an acute angle. First helical vane sections 64 are joined to the first body vane sections 62. Central body vane sections 68 are joined to the first helical vane sections 64 through second transitional sections 70. Second helical vane sections 72 are similarly joined to the central body vane sections 68 and to third transitional sections 74, which in turn are joined to end body vane sections 76. The body vane sections 62, 68, 76 have an incline angle of, for example 2.5 degrees. The pitch angle of the inlet vane sections 32 is approximately 1–10 times the pitch angle of the first body vane sections 62.

In the embodiment shown in FIG. 7, eight (8) vanes are included and extend substantially over the entire length of the central tube 78. Each vane 80 includes an inlet vane section 32, a first transitional section 61, a first body vane section 62, a first helical vane section 64, a second transitional section 70, a central body vane section 68, a second helical vane section 72, a third transitional section 74, and an end body vane section 76. The vanes 76 may advantageously be formed as weldments from the vane sections with the vane sections welded to each other, and to the tube 78. The rotors shown in FIGS. 1–6 may also be made with the transitional sections shown in FIG. 7.

In use, the rotor 60 spins in the direction R, and food product flows in the direction P. A high impact occurs as the food product moves into the transitional section and is impacted by the body vanes. This impact causes additional juice or liquid to be driven outwardly and through the screen. As the rotor spins at high speed, the transitional section, although radiused imparts high impact to the food product.

This effect is repeated at each transition point. As the food product is impacted, it also tends to reorient, so additional liquid or juices contained in the mass of material will be expressed through the screen at the next impact, i.e., at the next transition section 70. Additional transition points can be provided.

Thus, an improved food product finisher is disclosed which provides more efficient loading, high efficiency and less power consumption. While embodiments and applications of this invention have been shown and described, it would be apparent to those skilled in the art that many more modifications are possible without departing from the inventive concepts herein. The invention, therefore, is not to be restricted except in the spirit of the appended claims.

What is claimed is:

1. A food product finisher comprising:
   a finisher housing;
   a rotor rotatably supported on the housing and having a rotor inlet section and a rotor body section, with the rotor inlet section having an inlet section root diameter, and a plurality of inlet vanes curving at a first pitch angle, and with the rotor body section having a body root diameter equal to the inlet section root diameter, and with the rotor body section having a plurality of body vanes curving at a second pitch angle which is constant over the length of the rotor body, and which is less than the first pitch angle; and
   a screen on the housing surrounding the rotor.

2. The food product finisher of claim 1 wherein the body vanes have a height H and the rotor has a diameter ranging from 2 H to 6 H.

3. The food product finisher of claim 1 wherein each inlet vane is integrally joined with a body vane.

4. The food product finisher of claim 1 wherein the vanes have a pitch angle ranging from 1° to 60°.

5. The food product finisher of claim 1 wherein the number of body vanes ranges from 2 to 10.

6. The food product finisher of claim 1 wherein the screen is cylindrical.

7. The food product finisher of claim 1 further comprising a motor for driving the rotor.

8. The food product finisher of claim 1 wherein the first pitch angle is up to 10 times greater than the second pitch angle.

9. The food product finisher of claim 1 wherein the inlet section and the first body vane section are of about equal lengths.

10. A food product finisher comprising:
    a finisher housing;
    a screen supported by the housing;
    a rotor rotatably supported substantially within the screen, the rotor including a plurality of vanes, with each vane having an inlet section, a first transitional section joined to the inlet section, a first body vane section joined to the first transitional section, a first helical vane section joined to the first body section, a second transitional section joined to the first helical vane section, a central body vane section joined to the second transitional section; and
    a motor on the housing linked to the rotor for rotating the rotor within the screen.

11. The food product finisher of claim 10 wherein the first and central body vane sections are inclined, into the direction of rotation, at an angle of approximately 2½°.

12. The food product finisher of claim 10 wherein on substantially each vane, the first body vane section is generally parallel to the center body vane section.

13. The food product finisher of claim 10 further comprising on each vane, a second helical vane section joined to the central body vane section, a third transitional section joined to the second helical vane section, and an end body vane section joined to the third transitional vane section.

14. The food product finisher of claim 10 wherein the outside diameter of the inlet section vanes is less than the outside diameter of any other vane sections.

15. The food product finisher of claim 10 wherein the length of the inlet section is approximately 3–4 times greater than the height of the vane.

16. The food product finisher of claim 10 wherein the rotor has eight vanes.

17. In a food product finisher of the type having a rotor rotatably supported within a screen on a finisher housing, and a motor for turning the rotor, the improvement comprising:

the rotor having a plurality of vanes, with each vane having:
an inlet section;
a first transitional section joined to the inlet section;
a first body vane section joined to the first transitional section;
a second transitional section joined to the first body vane section;
a second body vane section joined to the second transitional section;
a third transitional section joined to the second body vane section; and
a third body vane section joined to the third transitional section.

18. The food product finisher of claim 17 wherein the first body vane section is generally parallel to the second body vane section.

* * * * *